3,199,655
BELT GRAVIMETRIC FEEDER ZEROING DEVICE
Wilbur H. Frazel, Riverside, R.I., assignor to The New York Air Brake Company, a corporation of New Jersey
Filed Sept. 12, 1963, Ser. No. 308,425
3 Claims. (Cl. 198—53)

This invention relates to a belt-type gravimetric feeder, and more particularly to a means which will permit the feeder to be zero set.

It is desirable in a belt feeder to set the device to zero, or what is known in the trade as "setting belt zero," with the hopper in fully loaded condition from a practical standpoint, and this is very difficult to attain, since leakage under the hopper gate readily occurs. This immediately suggests that there are some alternate ways to set the feeder at zero, the first of which would be to empty the hopper, thus preventing any leakage of material under the gate. However, this is not a satisfactory method of achieving zero since the load of material in the hopper creates a tension on the belt of the feeder and may affect the zero setting. The other alternate would be to push the chute control in the hopper more tightly against the belt, but this is undesirable as it may cause excessive belt wear and may jam the belt. It is accordingly an object of this invention to provide a zeroing device for a belt gravimetric feeder which does not present any of the disadvantages that have heretofore been experienced in zeroing belt-type feeders.

A more specific object of this invention is to provide a zeroing device in the form of a stationary sheet which extends underneath the hopper and effectively stops the withdrawal of material from hopper by the moving belt.

Other objects and advantages of this invention will appear as the description of the drawings proceeds.

Figure 1:
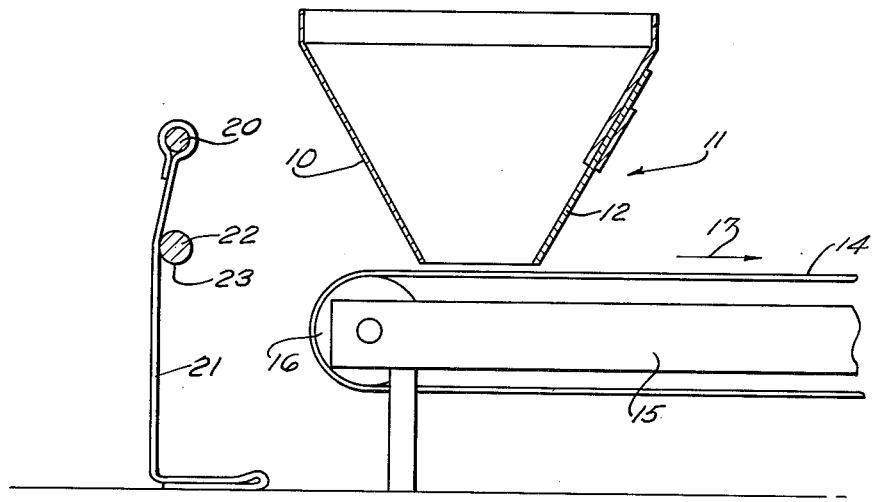
FIG. 1 is an elevational view partly in section showing the form of my improved belt zeroing device in inoperative position.

Referring now in detail to the drawings, the belt feeding means comprises a hopper 10 which has a variable gate opening as at 11 that includes a slidable gate means so as to obtain the desired rate of feed through the opening of the material that is in the hopper to a conveyor belt 14. The position of the slide means 12 is determined either manually or in some instances it may be automatically controlled by devices well known to those skilled in the feeding art and which form no part of this invention. The conveyor belt 14 operates in a continuous fashion over a pair of rollers mounted at either end of a framework such as 15, one roller 16 being shown in the drawing, it being understood that there is an identical roller at the opposite end of the frame 15. Drive means are provided to rotate the rollers, such as 16, and in turn move the conveyor belt 14, and intermediate the rollers at either end of the frame 15, a weighing scale means is provided, it being understood that the belt 14 travels in the direction of the arrows 17.

Figure 2:
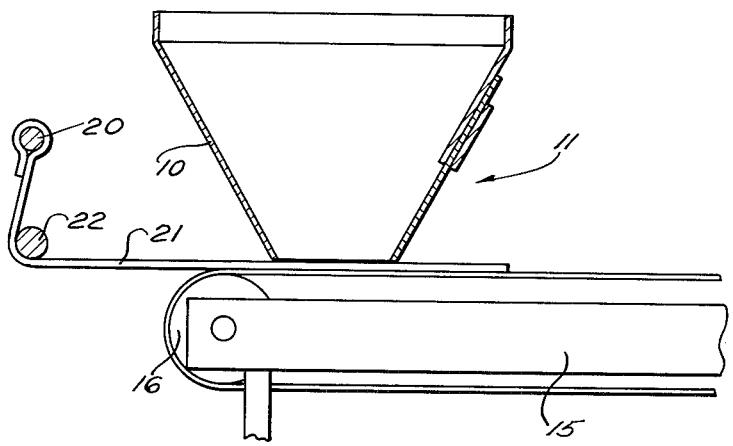
FIG. 2 is a view similar to FIG. 1 with the belt zeroing device of my invention in operative position.
Figure 3:
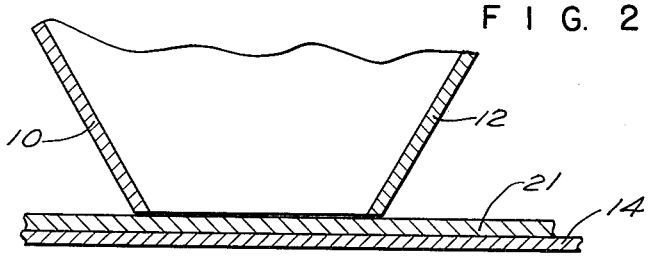
FIG. 3 is an enlarged sectional view showing a portion of the improved zeroing device in operative position.

Mounted adjacent the hopper 10 is an anchor means 20 shown in the form of a shaft, the axis of which is generally parallel to the transverse plane of the belt 14. On this anchor means 20 there is placed one end of a flexible closure such as a length of sheet material or belting 21 which passes to one side of a guide post 22 which has its lower edge as at 23 oriented parallel to and in a plane with the top edge of the belt 14. The material 21 need not be of a thickness substantially the distance between the end of the hopper and the belt 14; the thinner the material of the flexible closure 21 the better. When it is desired to place the closure 21 into position as shown in FIG. 2, the closure will extend around the post 22 and normally orient itself in substantially a planar attitude with the belt 14. When the closure 21 is in operative position, it will substantially close off the lower end of the hopper 10 and particularly that gap between the lower edge of the hopper 10 and the lower edge of the slide 12 so as to inhibit the flow of material out of the hopper 10. The belting 21 is normally maintained in closing position by virtue of the fact that the conveyor belt 14 is traveling from left to right as viewed in the drawing. The fact that member 21 is stationary is what prevents material escaping from the hopper.

The material of the closure 21 should be chosen so that it would produce the same friction on the belt that is produced by the material in the hopper under working conditions when the member 21 is withdrawn or as near that friction as possible, and by virtue of such loading a more nearly zero setting may be had.

I claim:

1. A feeder comprising a traveling belt, means to move the belt, a hopper above a portion of the belt, said hopper having a discharge opening substantially parallel to and spaced from said belt, a closure device comprising a stationary sheet of flexible material having a surface area sufficient to cover the hopper discharge opening and extend outward therefrom a substantial distance, said sheet throughout its extent resting upon said traveling belt and being pressed thereagainst by material in said hopper.

2. A feeder as in claim 1 including anchor means for the end of said stationary sheet, said anchor means being located substantially in the plane of the lower edge of the hopper opening.

3. A feeder as in claim 1 wherein the flexible sheet has a coefficient of friction with the traveling belt substantially equal to the coefficient of friction of the material in the hopper with the traveling belt when the flexible sheet is removed.

References Cited by the Examiner
UNITED STATES PATENTS
2,699,248   1/55   Shabaker _____ 198—56

SAMUEL F. COLEMAN, *Primary Examiner.*
ERNEST A. FALLER, JR., *Examiner.*